United States Patent Office 3,435,319
Patented Mar. 25, 1969

3,435,319
THERMAL RMS CONVERTER WITH FEEDBACK TO CONTROL OPERATING POINT
Peter L. Richman, Lexington, Mass., assignor to Weston Instruments, Inc., Newark, N.J., a corporation of Delaware
Filed Jan. 24, 1966, Ser. No. 522,733
Int. Cl. H02m 7/04; G01r 5/22
U.S. Cl. 321—1.5                              30 Claims

ABSTRACT OF THE DISCLOSURE

First and second thermoelements have their outputs connected differentially. The first thermoelement receives an input signal and the other receives a feedback signal. The difference signal drives an amplifier which provides the feedback signal and the system output. An auxiliary feedback loop compares the output variation with a reference and provides a correction signal to both thermoelements to maintain both elements at a preselected operating point, resulting in true isothermal operation.

---

The present invention relates generally to thermal conversion method and apparatus, and, more particularly, to apparatus for converting an input waveform to a DC output linearly proportional to the RMS value of the input waveform, the apparatus utilizing the properties peculiar to thermally sensitive elements in the processing of the input waveform.

Thermally sensitive elements, or thermoelements, constitute the broad class of devices exhibiting electrical characteristics that vary with temperature. In general, it may be stated that temperature-varying elecrical characteristics may include a change in one or more of the electrical properties of the device, such as resistance, capacitance, inductance, semi-conductance, and so forth, or may include the generation of an electrical parameter such as a voltage or a current (usually associated with thermoelectric devices exhibiting Seebeck, Peltier and/or Thomson effect), or may include an ancillary effect capable of being detected by external sensors, such as a field effect or field variation. Moreover, the process governing the relationship between temperature and electrical characteristics of the device may be thermodynamically reversible (e.g., reversal of temperature difference producing a change in the polarity of the voltage generated by the device, and, similarly, reversal of current direction producing a liberation or absorption of heat), or irreversible (illustrated by the simple variation of a property of the device upon subjection to heating, or by the dissipation of heat by a resistive medium irrespective of direction of current flow). The term "thermoelement," then, as used in this specification, specifically includes thermistors and thermocouples and any directly associated elements such as heaters, but in no sense excludes other thermally-sensitive devices, since, as will be apparent from a consideration of the ensuing description, the principles of the present invention are applicable to a wide variety of such devices. Therefore, while preferred configurations of apparatus embodying the principles of the invention utilize thermistors and/or thermocouples, it will be understood that no limitations are to be imposed thereby except as may be set forth in the appended claims.

The description of certain embodiments of the invention will relate to the automatic or manually-balanced conversion of an input waveform, which may be of the undulating type such as AC (not necessarily sinusoidal), random noise, triangular or square waves, and so forth, or of the unidirectional or unipolar type, such as DC, single polarity pulses, or a combination of the two types (e.g. AC with an offsetting DC level), to a DC output having a level proportional to the true RMS value of the total input waveform. As the description proceeds, however, it will be apparent that the invention is also useful in measurements of fluid flow rate, differential and/or absolute temperatures, differential and/or absolute radiation, and in various other situations in which the output is to be employed for or in conjunction with a control function.

As a general proposition, it is a common technique to utilize one or more thermoelements in combination with signal processing apparatus for applications of the types mentioned above. In view of the large volume of prior art relating to such apparatus and usage, it is highly impractical to attempt to categorize the number of methods or systems presently available to one who may be seeking appropriate means for performing any one of these various functions. It may be enlightening however, to consider, by way of example, one of the prior art proposals directed toward providing RMS-to-DC conversion through use of a compensated thermoelement system. In particular, the proposal contemplates the use of a pair of indirectly-heated thermocouples whose outputs are summed in opposing fashion to provide a DC error signal to a high gain negative feedback amplifier. A current derived from the input signal voltage is applied to the heater of one thermocouple, resulting in the generation of a DC output voltage from that thermocouple proportional to the power dissipated by the heater in the form of heat. Since the heater's power dissipation is a function of the square of the effective value of the input current, the thermocouple output voltage is also proportional to the square of the effective or RMS value of the input signal voltage. The other indirectly-heated thermocouple is located in the feedback path of the high gain amplifier, its heater arranged to pass a current derived from the amplifier output voltage. Hence, the output voltage of the second, or feedback, thermocouple is proportional to the square of the effective or RMS value of the output voltage of the system (the useful output being taken from the amplifier), and, as previously stated, is summed with the output of the first thermocouple to produce the error voltage. Operation of this prior art type of compensated thermoelement system results in an overall system DC output voltage proportional to the RMS value of the input voltage, provided, however, that the two thermoelements (in the example cited, indirectly-heated thermocouples) possess perfect square-law characteristics. It will be noted, moreover, that a variety of factors affect the characteristic curves of the thermoelements and that some control must be exercised over each of these factors in order to maintain the desired square-law response. In particular, approaches such as that taken in the prior art system summarized immediately above suffer from deviations inherent in the characteristic curves of any two or more thermoelements, from each other or from some theoretically or arbitrarily imposed standard. Additionally, inaccuracies are prevalent in such thermoelement-utilizing instruments beyond the deviation from prefect square-law characteristics, either because of inadequate frequency response, settling time (speed of response to changes in the input signal), variations in the ambient temperature about each thermoelement, differences in the ambient temperature to which the several thermoelements are exposed, and so forth, or a combination of these deleterious factors.

Probably the most serious defect in prior art systems of the compensated thermoelement type lies in the variation between the E–I² (output voltage-versus-input power law) characteristic curves of the different thermoelements over even a modest variation in the range of the input signal. Input current variations as low as 3 to 1, for example, have been found to yield large errors. Obviously, the thermoelements can be, and usually are, selected to provide as close a match as possible so as to enhance "tracking" of their characteristics. Nevertheless, instruments manufactured on the basis of this balanced approach are severely limited in accuracy and, hence, in application, by the deviation of the characteristics of the thermoelements from each other. It should be emphasized that the disadvantages of prior art approaches are not peculiar to the use of any one particular type of thermoelement, but are encountered in practice for all types.

Accordingly, it is a principal object of the present invention to provide systems and a method for converting an input waveform to a DC output, or to any other desired output waveform having an RMS value proportional to the RMS value of the input waveform (hereinafter referred to as RMS-to-DC converter), and which overcome one or more of the disadvantages of prior art systems of this general type.

It is another object of the present invention to provide an RMS-to-DC converter capable of providing an output related to RMS input with exceptional linearity over a wide input range, and with an accuracy approaching several orders of magnitude greater than accuracies obtained by prior art converters of this general type.

A further object of the invention resides in the provision of an improved RMS-to-DC converter particularly adapted for use in precision measuring and/or control systems.

Still another object of the present invention is to provide RMS-to-DC converters capable of providing highly accurate measurements of the RMS value of an input waveform irrespective of the nature of the variations, if any, in that waveform.

It is another object of the present invention to provide RMS-to-DC converters utilizing improved compensated thermoelement systems to provide high accuracy, speed of response and reliability in a fully automatic system.

A further object of the invention is to provide a compensated RMS measuring system wherein the measured output level is linearly proportional to the true RMS level of the input signal.

Another object of the invention is to provide an improved RMS-to-DC converter wherein the operating point of one of an input thermoelement and a feedback thermoelement is monitored to effect and maintain automatic control of the operating points of both thermoelements. Another object is to provide a method of producing an output signal having a magnitude which is linearly proportioned to the RMS value of an input signal.

Briefly, these and other objects are carried out by the use of apparatus wherein the output of a thermoelement to which the input waveform is applied is compared with the output of a further thermoelement to which a feedback signal is applied, the feedback signal being derived from the output of an amplifier circuit to which the signal obtained from the comparison is applied and the amplifier output constituting the useful system output. According to the present invention, the characteristic of the thermoelement that exhibits sensitivity to thermal variations is monitored and is used, in conjunction with a preselected reference characteristic of the same type, to produce a correction signal which is fed back, in one form or another, to exercise appropriate control over the operating point of each of the thermoelements. In particular, the corrective feedback is effective to maintain the operating points of both thermoelements invariant, independent of the input waveform applied to the system and of ambient temperature changes in the vicinity of the thermoelements. In this manner, all but higher order non-linearities of the thermoelements are eliminated, with accompanying improvements including higher accuracy (i.e., substantial elemination of ill-effects due to deviations from square-law), reduction of drift, and increases in speed of response.

The reference characteristic, for example, a reference resistance in the case of a thermistor or a reference voltage in the case of a thermocouple, is selected in accordance with the response of the particular thermoelement or thermoelements employed in the apparatus at an arbitrary temperature. It will, of course, be noted that the thermal operating point of the thermoelements must be a compromise between excessively high values and excessively low values of temperature in order to prevent undesirable effects, such as Peltier or Seeback effect on the one hand, and inadequate sensitivity on the other. It should also be noted that the reference characteristic should be exactly equal to the value of the temperature-varying characteristic of the thermoelement at the selected thermal operating point.

Conventional thermal compensation and parameter attenuation techniques may also be employed, if desired, to perfect the linearity between output and input of the converter apparatus, but, in general, such techniques will not be further discussed both because of their well-known character and because they are not critical to the inventive concepts. It is sufficient to note, for example, that such refinements as the use of a series resistor, in the case of use of a thermistor, with another resistor shunting the thermistor and its series resistor, and use of the overall resistance value in such an arrangement as the attenuated thermal-varying characteristic, are considered to fall within the scope of the present invention. The same is true for the wide variety of thermal compensation and output calibration arrangements presently in use.

The above and still further objects, features, and attendant advantages of the present invention will become apparent from a consideration of the following detailed description of certain specific, but non-limiting, embodiments thereof, especially when taken in conjunction with the accompanying drawings, in which.

Figure 1:
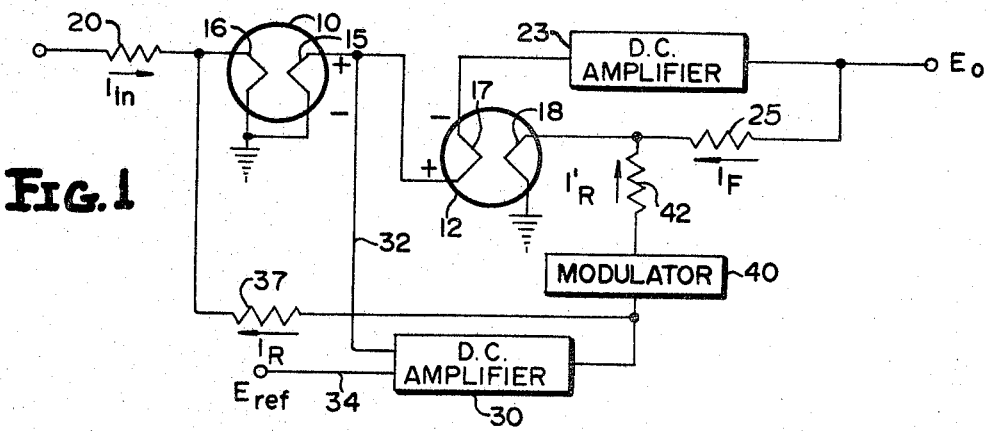
FIGURE 1 is a circuit diagram of a basic embodiment of one form of the invention.

Referring now to FIGURE 1, one embodiment of the invention comprises a pair of thermoelements 10, 12, each including a thermocouple 15, 17, and a heater 16, 18, respectively. The two thermocouples are so arranged that the voltages generated thereby in response to currents supplied to their respective heaters are of opposing polarity, so that the sum of the two voltages constitutes an error signal representing the difference therebetween, in terms of both polarity and magnitude.

The current $I_{in}$ passing through heater 16 of theremoelement 10 is derived from the input signal voltage in any convenient and conventional manner, such as by the use of a current feedback amplifier (not shown) or by merely amplifying the signal voltage and applying the amplified voltage to a dropping resistor, e.g. 20, of high resistance value. Thus, the relationship of direct proportionality exists between input signal voltage and input current $I_{in}$. The current supplied to heater 18 of thermoelement 12 is obtained from the DC voltage output of DC high-gain amplifier 23, to which the sum of the output voltages of the two theromcouples 15 and 17 is applied in the form of an error voltage, a feedback dropping resistor 25 being used to convert the output voltage $E_o$ to a proportional heater current. Alternatively, amplifier 23 may be a current feedback amplifier. Thus, the voltage across the output terminals of the feedback thermoelement 12, i.e., the voltage generated by thermocouple 17, constitutes a negative feedback signal to the amplifier.

The voltage $E_o$ constitutes the useful system output, and, ideally, is linearly proportional to the RMS value of the input waveform (that is, the voltage from which $I_{in}$ is derived), provided that input thermoelement 10 and feedback thermoelement 12 possess perfect square-law characteristics or have been selected (matched) to provide as nearly as possible a tracking of their characteristics. Various conventional refinements may be employed, but basically that portion of the embodiment of FIGURE 1 thus far described correspnods to the compensated thermoelement system discussed as an example of the prior art earlier in this specification.

As previously noted, the basic limitation inherent in this approach resides in the devitation of the characteristics of the input and feedback elements from a common output voltage-versus-input power law. The result is a departure of $E_o$, the useful system output voltage, from true proportionality to $(E_{in})_{rms}$, the RMS value of the total input signal voltage, over a range of $E_{in}$. Even with conventional 1, 3, 10, 30, and so on, ranging, input power variation can be 11:1 and deviations between thermoelements over this range are substantial.

In accordance with the present invention the operating point, and, hence, the operating temperature, of one of the thermoelements is monitored by sensing the property or parameter of the thermoelement that varies with temperature, and comparing that property or parameter with either a fixed reference as shown in FIGURE 1, or with the same parameter of a corresponding type of thermoelement utilized as a reference. The comparison signal, in effect an error signal but hereinafter referred to as a correction signal to prevent any confusion with the error signal associated with the primary feedback loop, is applied via an auxiliary feedback loop to both thermoelements to maintain the two at a constant, non-varying operating point, independent of RMS converter input. The result is a true isothermal operation in the sense of maintenance of the operating point temperature independent of input power and/or ambient temperature changes, and provides RMS-to-DC conversion with accuracy, speed of response, and reliability heretofore unachieved in the art, in a fully automatic system. It should be understood, of course, that the above references to "primary feedback" and "auxiliary feedback," and to "comparison signal," "error signal," and "correction signal," have no special significance other than to distinguish between operating parameters and/or general configurations within the system.

For the system embodiment shown in FIGURE 1, the inventive concepts are incorporated in the form of a high gain, DC operational amplifier 30 for comparing (e.g., by simple summation) the voltage obtained from thermocouple 15 of thermoelement 10 with the arbitrarily selected reference voltage $E_{ref}$ (preferably of the same order of magnitude), applied via paths 32 and 34 respectively, and further circuit means for applying correction signal derived from the amplified comparison (error) voltage to each of the two thermoelements. The latter means may comprise a path containing a resistor 37, for conversion of the DC output voltage of amplifier 30 to a related current $I_R$ (a reference correction current), and for application of that current to the heater 16 of input thermoelement 16; while the reference correction current $I_R'$ may be derived via a second path including modulator 40 and dropping resistor 42 for application to heater 18 of thermoelement 12. Modulator 40 may comprise any convenient and conventional device for converting the amplifier 30 DC output voltage to an AC voltage (such as a sine wave or a squarewave) with RMS amplitude directly proportional to the amplifier output voltage.

The use of this particular configuration is limited, however, to cases in which the input current $I_{in}$ is a periodic AC with no DC component; subsequent embodiments will illustrate configurations adapted to use with the more generalized input waveform described earlier. In the restricted situation for which this embodiment is effective, then, the DC reference correction current $I_R$ is orthogonal to the AC input current $I_{in}$, by definition. That is to say, the integral of the product of these two currents, taken over an integral number of cycles must be equal to zero— the definition of orthogonality—since the input waveform, restricted to a periodic AC signal (sine wave, square wave, triangular wave, etc.) with no DC component, is the only one that comes into play.

Similarly, the integral of the product of the DC feedback current $I_F$, derived from the output voltage of amplifier 23, and the AC reference correction current $I_R'$, having an RMS value directly proportional to the level of the DC correction signal by virtue of the operation of modulator or converter 40, must be zero, insuring orthogonality for these two currents as well. Therefore, the respective output voltages of the two thermoelements 10, 12 (i.e., the voltages generated by thermocouples 15 and 17 in response to heat transferred from their respective heaters 16 and 18) are proportional to the simple sum of the squares of the heater currents, $I_{in}$ and $I_R$ in the case of thermoelement 10 and $I_F$ and $I_R'$ in the case of thermoelement 12, with no cross product terms.

It will immediately be appreciated that the lack of cross product terms in the expressions governing the thermoelement output potentials insures that the two thermoelements may be maintained at a constant, non-varying operating point while still permitting a balance between those two output potentials. The balance condition is indicative of equality between the RMS input current $I_{in}$ and the DC feedback current $I_F$, the latter being proportional to the useful system output voltage $E_o$.

To provide perhaps a better understanding of the meaning of this operation, assume that modulator 40 were omitted from the system. In that event, $I_R'$ would simply be a direct current identical to $I_R$ (assuming also, of course, that the parallel paths taken by these two reference correction currents are now identical in every meaningful respect), and, therefore, no orthogonality would exist between $I_R'$ and the DC feedback current $I_F$. The output potential for thermocouple 17 would, in fact, be proportional to $(I_F+I_R')^2$, rather than to $(I_F^2+I_R'^2)$ as occurs with the presence of modulator 40 as shown in FIGURE 1, and the resulting existence of the cross-product term $(2I_FI_R')$ would introduce an error in the desired correspondence between RMS values of input and feedback currents $I_{in}$ and $I_F$, respectively, invalidating any true RMS conversion. On the other hand, the corrective or auxiliary feedback loop as shown in FIGURE 1 insures the automatic maintenance of a constant, non-varying operating point for the two thermoelements and, as well, that the condition for equality of the output potentials of the two thermoelements remains $I_{in\ (rms)}^2=I_F^2$ (provided the RMS values of $I_R$ and $I_R'$ are equal). The latter condition, it will be noted, is the same as that for the prior art configuration initially discussed in the description of FIGURE 1.

I do not, in any sense, mean to imply that the mere maintenance of constant operating point is novel. The use of thermoelements, and thermocouples in particular, at constant operating temperature is conventional in the design of a variety of prior art AC–DC voltage and current transfer standards. However, insofar as I am aware, the prior art neither teaches nor suggests any means or method corresponding to those according to the present invention, by which to achieve the desired operating point invariance. As a point of fact, in the prior art devices the thermoelement operating point for one input signal is generally set equal to the operating point for a second input, and equality of the RMS values inferred. Operating point readjustments are then normally made by varying either one or the other of the two inputs to be compared.

The prior art configuration described initially in the discussion of FIGURE 1 has been offered as a means for automating this AC-DC comparison, but, as previously discussed, is subject to several specific drawbacks. Nevertheless, that method is the basis for several commercial 1% RMS meters. In contrast, RMS-to-DC conversion apparatus according to the embodiment of FIGURE 1 and according to other embodiments of the invention, some of which will be described in detail presently, are characterized by performance that represents at least an order of magnitude improvement over results obtainable with previous methods.

Figure 2:
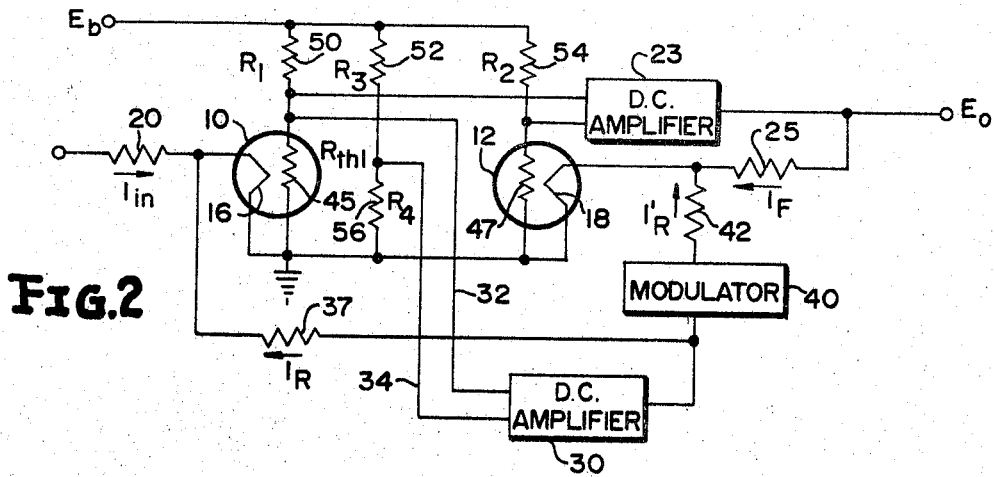
FIGURE 2 is a circuit diagram of another basic embodiment of the invention.

Referring now to the embodiment shown in FIGURE 2, wherein for purposes of convenience and clarity similar components are designated by the same reference numerals as used in FIGURE 1, thermoelements 10, 12 comprise thermistors (e.g., bead thermistors) 45, 47 and associated heater elements 16, 18, respectively. Here, of course, the thermally-sensitive parameter is resistance, each of the thermistors exhibiting a resistance that varies with temperature. Each thermistor is connected in a separate leg of a resistance bridge circuit formed by fixed, temperature-insensitive resistor 50 and thermistor 45 in one leg and fixed, temperature-insensitive resistor 54 and thermistor 47 in the other leg. The bridge is energized by any suitable source of power, such as a DC voltage supply $E_b$. An error voltage derived across the other diagonal of the bridge as a result of any unbalance between the resistances of thermistors 45 and 47, owing to a difference between the RMS value of $I_{in}$ and the DC value of $I_F$ applied to heaters 16 and 18, respectively, is supplied to amplifier 23 and the amplifier output voltage $E_o$ taken as the useful system output. This, of course, assumes that the thermoelements 10 and 18 are perfectly matched to provide tracking of their characteristics, a condition which, as previously noted, is rarely met in practice. The configuration thus far described in connection with FIGURE 2 is found in the prior art and is analogous to the prior art embodiment initially described in the discussion of FIGURE 1.

In the FIGURE 2 system, my inventive concept is embodied in a monitoring and corrective feedback network comprising an auxiliary bridge whose output is supplied to amplifier 30 and the amplifier output thence applied to parallel paths connected to the respective heaters of thermoelements 10 and 12. The auxiliary bridge includes resistor 50 and thermistor 45 in one of its legs and fixed resistors 52 and 56 in the other leg, and serves to monitor any deviation of the ratio $R_1/R_{Th1}$ from the fixed value set by the reference ratio $R_3/R_4$. This constitutes monitoring of the operating point of thermoelement 10, and any departure from the desired operating point (set by resistors 50 ($R_1$), 52 ($R_3$), and 56 ($R_4$)) manifests itself in the form of an error signal output from the auxiliary bridge. The remainder of the corrective feedback network corresponds, in both structure and operation, to that described in connection with FIGURE 1 and need not be further elaborated upon here. As in the case of the FIGURE 1 embodiment, the choice of which thermoelement operating point is to be monitored is not critical, the selection of the input thermoelement in both cases, however, being preferred to simplify the considerations with regard to stabilization of the system.

It will be appreciated that any scheme for monitoring the resistance of the selected thermistor and for comparing that resistance with a reference value in order to obtain an error signal, would be similarly effective to that shown in FIGURE 2; such variations in the specific details of construction are intended to fall within the spirit and scope of the present invention. As an example, one alternative monitoring arrangement might include a device for sensing current drawn by the $R_1$-$R_{Th1}$ path from voltage supply $E_b$ and thereafter comparing the monitored current with a reference level. The scheme depicted in FIGURE 2, however, has the advantage of relative insensitivity to variations in the level of $E_b$.

Other variations readily suggest themselves to those skilled in the art as alternatives to the analogous configurations of FIGURES 1 and 2. Among these are the modulation of the corrective feedback at a harmonic of the input current $I_{in}$, the use of AC bridge excitation, and, as still another modification, the use of a reference potential comprising the sum of an AC and a DC potential. In the first exemplary variation, restricted to periodic input signals, advantage is taken of the fact that an AC signal is characterized by a relationship of orthogonality with any of its harmonics. Hence, if the auxiliary reference feedback error signal applied as an input to amplifier 30 were modulated at a harmonic generated by $I_{in}$, its direct amplification and direct application to the heaters of thermoelements 10 and 12 could be effected without resort to modulator 40 in the $I_R'$ feedback path.

The second modification mentioned above, that of AC (e.g., sine wave or square wave) excitation of the bridge in the thermistor embodiment of FIGURE 2, takes advantage of the often more readily provided (in terms of simplicity, economy and accuracy) demodulation of AC signals than modulation of DC with AC. If the bridge supply voltage $E_b$ were AC, then both error signals $\epsilon_1$ and $\epsilon_2$ (where $\epsilon_1$ is the output of the primary bridge and $\epsilon_2$ the output of the auxiliary bridge in the dual bridge arrangement of FIGURE 2) will also be AC. Demodulation of the output of amplifier 23, here an AC amplifier, provides the DC output $E_o$ and the DC feedback to the heater of thermoelement 12, while the output of amplifier 30, also an AC amplifier in this case, is directly applied to resistor 42 and demodulated for application to resistor 37, to supply the supplementary or corrective currents to the respective thermoelement heaters. If the AC bridge excitation is a harmonic of the periodic input signal, then both heater correction currents may be directly obtained from the output of amplifier 30 without demodulation, for reasons discussed above.

In the third variation mentioned, that of employing the sum of an AC potential and a DC potential for the reference $E_b$, the DC may be filtered from the output of amplifier 30 by simply providing capacitive coupling for the error signal $\epsilon_2$, and the AC may be eliminated from the output of amplifier 23 by utilizing a low-pass filter in the system output line. In this manner, the output $E_o$ is the desired DC potential, linearly proportional to the RMS value of the input signal, and which is also converted to the primary feedback current, via dropping resistor 25, for heater 18 of thermoelement 12. On the other hand, the AC output of amplifier 30 is directly applicable to resistor 42 to heater 18, and may be demodulated for application to resistor 37 to supply the feedback current $I_R$ which is mixed with input current $I_{in}$ for the heater of thermoelement 10.

Again, it is to be emphasized that these modifications are meant only to illustrate a few of the many variations that are possible within the scope of the present invention. If a generalization of the concepts of the invention thus far disclosed is to be made, it may be stated to encompass the derivation of an error between the output of one of the two thermoelements (the selection of one or the other not being particularly critical) and a prescribed reference; the application of this error to an amplifier (preferably, high-gain); the splitting of the output of the amplifier, when necessary, into two separate signals, respectively orthogonal to input signal $I_{in}$ and to feedback signal $I_F$ (note that only one signal need be derived in the case of modulation at a harmonic of the input signal, as mentioned above), for subsequent application to the respective heaters of the two thermoelements; for the purpose of maintaining the (thermal) operating points of the two thermoelements constant, independent of the RMS value of the input signal (from which $I_{in}$ has been derived) over a wide range of values.

Figure 3:
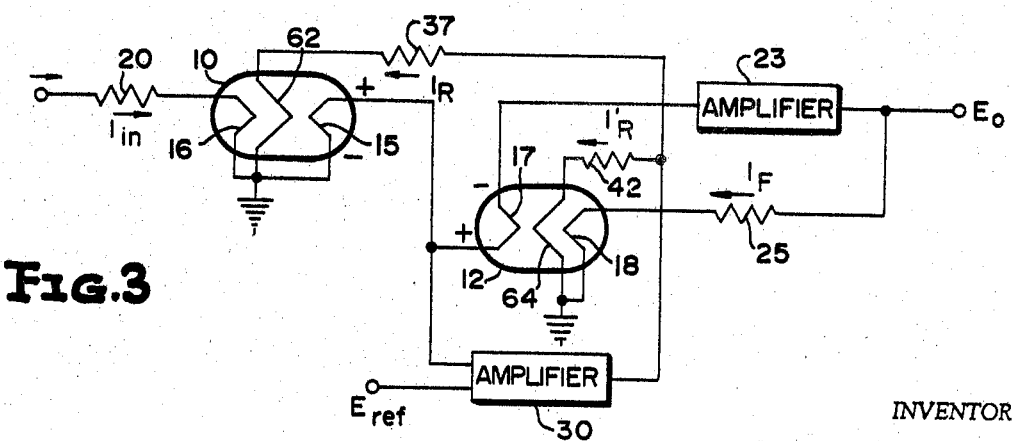
FIGURE 3 is a circuit diagram of a basic embodiment of another form of the invention.
Figure 4:
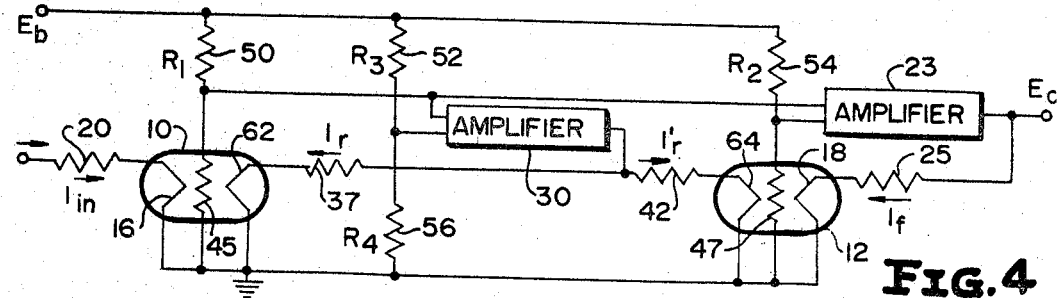
FIGURE 4 is a circuit diagram of still another embodiment.

Another species of the invention involves a system of power additions for input and auxiliary heater energization in the input thermoelement, and for feedback and auxiliary heater energization in the feedback thermoelement; utilizing multiple heater arrangements in each of the thermoelements. Unlike the first species or form of the invention, which was restricted to periodic inputs with no DC component, this second form permits the application of a very generalized input waveform, as discussed earlier, to the system. More specifically, in the second form embodying the concepts of the present invention, a common feedback signal is derived from a comparison of the operating point of either of the thermoelements with a reference, and this common feedback then applied to an auxiliary heater of each of the thermoelements. Here again, references to specific configurations will be made in terms of using thermocouples and thermistors, but, as before, it will be understood that no limitations are to be placed upon the type of thermoelements, or combinations thereof, which may be employed to achieve the desired result. Reference will now be made to FIGURES 3 and 4 of the accompanying drawings, where reference numerals corresponding to those used earlier have, as much as possible, been retained to designate similar components or components having the same general function.

In FIGURE 3, it will be noted that the application of input current $I_{in}$ to heater 16 of thermoelement 10 via dropping resistor 20, the application of feedback current $I_F$ to heater 18 of thermoelement 12 via dropping resistor 25, and the derivation of an error voltage by summing the output potentials of thermocouples 15 and 17, respectively, for application to amplifier 23, from which useful system output $E_o$ is obtained, correspond identically to the operations performed by like components in the system of FIGURE 1, and, without more, to the prior art system previously described. Here, however, each of the thermoelements has an additional or auxiliary heater 62, 64, respectively.

The output potential of thermocouple 15, in addition to being summed with the voltage output of thermocouple 17, is compared in amplifier circuit 30 with a preselected reference voltage $E_{Ref}$, and the amplified error voltage converted to reference correction feedback currents by each of resistors 37 and 42 for application to the respective auxiliary heaters 62 and 64 of thermoelements 10 and 12. Since there is no electrical connection between the first and second heaters of any one of the thermoelements and the thermal junctions, or between any two of these, the power (proportional to $(I_{EFF})^2$) from the two heaters in a given thermoelement is additive. Essentially, this is the same effect as the orthogonal addition (a power addition) obtained in the embodiments of FIGURES 1 and 2. Resistors 20, 25, 37, and 42 may be adjustable to achieve optimum linearity and balancing of the thermal characteristics of the two thermoelements. The result of the dual-heater operation with corrective feedback derived from the monitored operating point of one of the thermoelements is again a maintenance of the operating point of each thermoelement invariant with input $I_{in}$ (and, of course, with the input signal from which $I_{in}$ is derived) to provide a system output $E_o$ that is a true representation of the RMS value of the input signal.

Referring now to FIGURE 4, the thermistor embodiment there shown is analogous to the thermocouple embodiment of FIGURE 3, except that here the temperature-varying parameter is resistance. As in FIGURE 2, a dual bridge arrangement is utilized, with the output of one bridge $R_1$–$R_{T1}$ (resistor 50, thermistor 45), $R_2$–$R_{T2}$ (resistor 54, thermistor 47) being representative of the difference between the resistances of the two thermistors, and amplified to provide system output $E_o$. In this embodiment, however, operating temperature of the input thermoelement 10 is sensed by comparing the bead resistance of its thermistor with a fixed, stable reference resistor $R_4$ (resistor 56) in the auxiliary bridge composed of $R_1$–$R_{T1}$, $R_3$–$R_4$; the auxiliary bridge output used as an error signal to drive DC amplifier 30; and the amplifier output used to supply equal amounts of power to auxiliary heaters 62 and 64. Again, element values may be adjusted for balancing purposes, to provide optimum performance.

In each of the thermistor embodiments, the bridge excitation $E_b$ may be floating, if desired, with the return paths of thermistors 45 and 47, as well as that of resistor 56 ($R_4$), still connected together, but ungrounded. The junction of $R_1$ and thermistor 45 may then be grounded so that the two bridges supply direct error signals to amplifiers 23 and 30, respectively, in which case the two amplifiers may be of the single-ended rather than differential type. These, of course, are details readily appreciated by those skilled in the art, and are in no sense critical.

An added feature of the present invention is the extremely low response time of the various systems embodying its concepts. Rapid response is, to a first order, a function only of amplifier performance (including noise), feedback loop stabilization, and relatively simple precautions in thermoelement production and testing. The adjustment and proper apportioning of amplifier time constants is purely conventional, and it will also be appreciated that the output voltage $E_o$ may be monitored to derive therefrom an AGC (automatic gain control) signal for application to the amplifiers to maintain constant loop gain. Again, such details are merely refinements which are ancillary to, and not a part of, the real invention.

Figure 5:
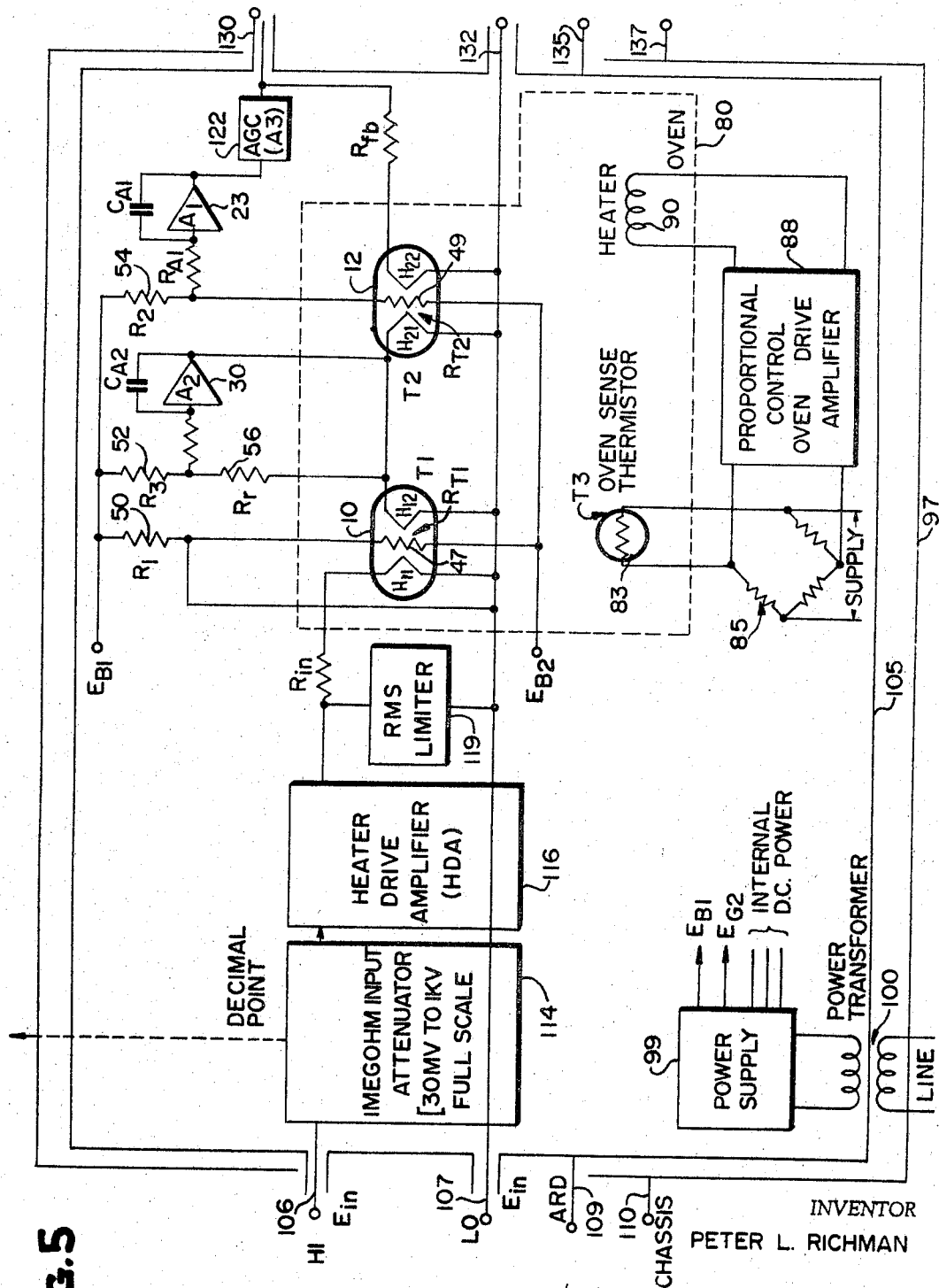
FIGURE 5 is a circuit diagram of a system utilizing the exemplary embodiment of FIGURE 4.

FIGURE 5 is an illustrative form of a complete circuit package incorporating the basic RMS-to-DC converter of FIGURE 4. Each of thermoelements 10 and 12 may comprise a six-lead device with the two heaters and the bead (or resistance element) completely insulated from one another and housed in a sealed, evacuated glass envelope. Basic thermistor response time, with no feedback loops, is on the order of five seconds to traverse two-thirds of the distance to the final bead resistance value, for either heating or cooling. By using two thermistor units in conjunction with the double-bridge two-loop feedback system, however, the total converter has far faster settling time than the response time of each thermistor alone would indicate. The heaters are preferably Karma or Evanohm, nominally 50 ohms each, with bead resistance in the range of one to two K (kilohms) at the thermistor operating temperature.

The two thermoelements 10, 12, each surrounded by a rubber cushion, are mounted in an oven assembly, generally designated by reference numeral 80. Oven temperature is maintained constant within twenty millidegrees centigrade for normal room ambient changes, and forty millidegrees for an increase in ambient from 20 to 30 degrees centigrade. Stability of the temperature differential between the two thermoelements within the housing is more than an order of magnitude better than the absolute oven temperature stability.

Temperature sensing within oven 80 may be accomplished by thermistor 83, directly heated via the oven block in which it is imbedded. Thermistor 83 is included in one arm of a bridge 85 which supplies an oven temperature error signal to a proportional-control amplifier 88, employed to drive the oven heater winding 90. Nominal oven operating temperature may thus be maintained at, say 75 degrees centigrade.

The electronics for the RMS-to-DC conversion system is enclosed within an outer chassis 97. Power for the electronics is supplied by power supply 99 via a shielded power transformer 100 whose primary is effectively outside and whose secondary is effectively inside a guard enclosure 105 within chassis 97. This combination is effective to provide fully floated, guarded operation with 110 db of common mode rejection at 60 Hz., with a 1K source impedance in the input-low lead 107. Although optimum performance is obtained when the converter is enclosed within a floating guarded readout instrument, converter guarding and line isolation are effective alone to insure against introduction of spurious signals by the converter itself.

A four wire converter input is provided comprising high, low, guard, and chassis leads or terminals 106, 107, 109 and 110, respectively. The input signal $E_{in}$ is applied, for example, to a 1 megohm input attenuator 114 which is arranged to provide 10 ranges, from 30 mv. to 1 kv. full scale in the conventional 1, 3, 10, 30, etc. RMS. meter sequence. Closures indicative of selected range for remote external decimal point use may be provided, if desired, without violating the guard.

The output of attenuator 114 is applied to heater drive amplifier 116 whose output supplies the heater element of input thermoelement 10. An RMS limiter 119 may be provided across the output of the heater drive amplifier to protect against RMS overloads without impairing the capability of the converter to handle high crest factors. A suitable embodiment of an RMS limiter is, for example, an extremely fast response self-heated precision thermistor having resistance versus RMS current characteristics which, in conjunction with the non-feedback limiting characteristics of the feedback heater drive amplifier 116, are effective to protect the input thermistor heater without degrading performance of amplifier 116 in linear (i.e., non-overloaded) operation.

The dual bridge arrangement of the basic converter in FIGURE 5 is modified somewhat from the simplified form shown in the embodiment of FIGURE 4, in that the grounded bridge supply $E_b$ of the earlier embodiment is replaced by a floating bridge supply $E_b1$–$E_b2$, allowing a ground to be introduced at the junction of thermistor 45 and its associated bridge resistor 50. This variation, as previously discussed, permits use of single-ended rather than differential amplifiers for units 23 and 30 in the main and auxiliary feedback loops, respectively. The main loop error signal is thus available at the high end of thermistor 47 (i.e., the junction between thermistor 47 and bridge resistor 54), while auxiliary loop error is taken from the junction of reference resistor 56 and bridge resistor 52. The DC amplifiers 23 and 30 effectively function as integrators to supply a high steady state gain in each feedback loop. If desired, amplifier 23 may be followed by a conventional AGC amplifier 122 to provide a constant loop gain independent of output voltage.

The main loop output of amplifier 23 is employed to drive the feedback heater of thermal element 12 and furnishes the RMS-to-DC converter output voltage $E_{out}$ as well. Amplifier 30 in the auxiliary feedback loop provides an output that supplies the auxiliary heater of each of thermoelements 10 and 12. As will be recognized, the basic RMS-to-DC converter apparatus corresponds almost identically to that shown in FIGURE 4, so that further explanation of that apparatus is unnecessary.

The converter system of FIGURE 5 employs a four wire DC output consistent with the four wire input: that is, high, low, guard and chassis terminals identified respectively by reference numerals 130, 132, 135 and 137. Full scale DC output may, for example, be 10 volts on the "10" scale and three volts on the "3" scale. All internal power for the converter instrument shown in FIGURE 5 is furnished by isolated power transformer 100 and its associated power supply 99.

Figure 6:
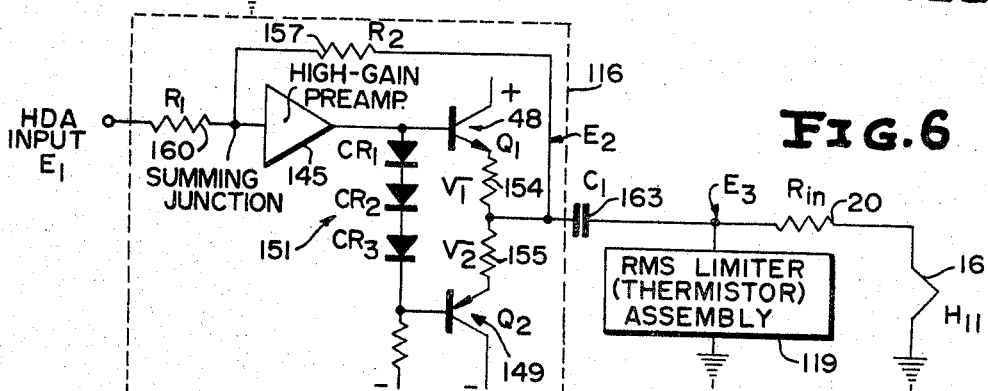
FIGURE 6 is a circuit diagram illustrating a portion of the apparatus used in the system of FIGURE 5.

A suitable embodiment of heater drive amplifier 116 of FIGURE 5 is shown in FIGURE 6. A high gain, wide band preamplifier 145 is employed to drive a push-pull emitter-follower output stage comprising transistors 148 and 149 biased by diodes generally designated by reference numeral 151. The overall feedback for the heater drive amplifier is taken from the junction of output stage emitter resistors 154 and 155 and is applied via resistor 157 to a summing junction between the feedback resistor and input resistor 160. Capacitor 163 couples the output of amplifier 116 to the heater 16 of thermoelement 10 via input resistor 20, and, as well, to the RMS limiter 119.

In operation, as long as the resistance of the RMS limiter in parallel with the heater circuit of thermoelement 10 can be driven by the output stage (i.e., the push-pull emitter follower output stage of amplifier 116), high negative feedback around the entire heater drive amplifier insures that the output waveform thereof is almost an exact replica of its input waveform. However, when the RMS value of the output waveform of amplifier 116 exceeds a preset limit, the RMS limiter impedance drops to a value such that peak currents can no longer be supplied without saturating either transistor 148 or transistor 149, because of the resistor 154 and/or resistor 155 current limitation. Hence, proper choice of components and operating points of components will insure full accuracy for high crest factors while providing complete protection for the heater 16.

Figure 7:
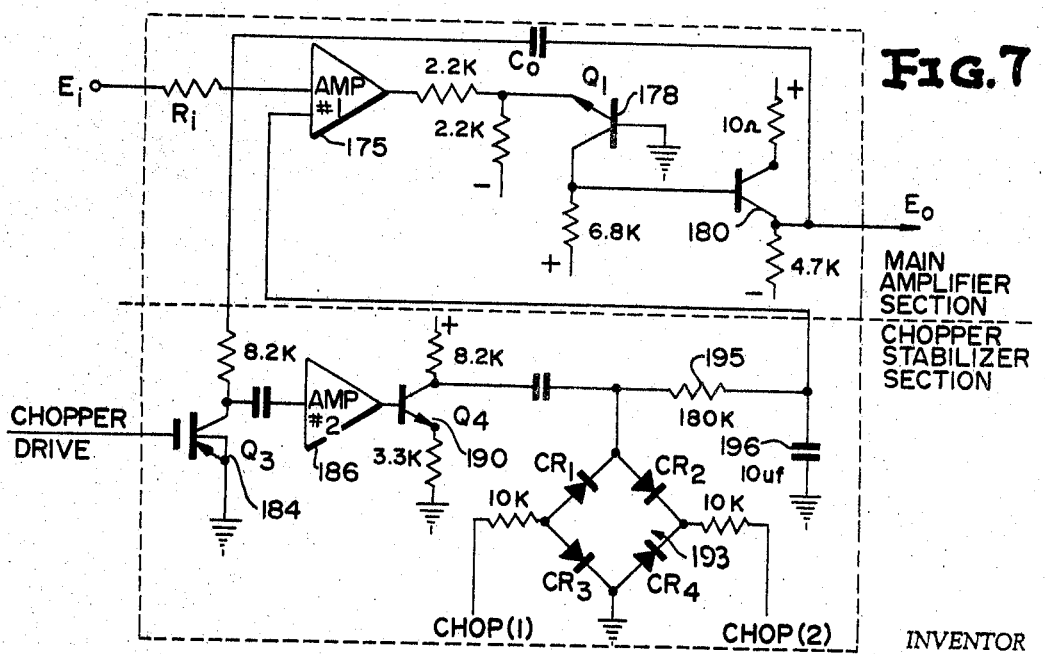
FIGURE 7 is a circuit diagram of an exemplary operational amplifier suitable for use in the circuits of FIGURES 1–4.

One embodiment of an amplifier suitable for use as each of the DC operational amplifiers 23 and 30 is shown in FIGURE 7. Each DC amplifier includes a conventional chopper-stabilizer section preferably providing a minimum total DC amplifier gain of approximately 20 million, and insuring a temperature sensitivity less than 1 microvolt per degree centrigrade.

The main amplifier section of the embodiment shown in FIGURE 7 derives the greater portion of its gain from differential amplifier 175, with additional gain, plus drive amplification and power gain, being provided by output transistors 178 and 180.

The chopper transistor 184 may be a metal-oxide-silicon field-effect transistor providing essentially zero offset voltage. Chopper amplifier gain is supplied for the most part by a second amplifier 186, with transistor 190 coupled to the output of amplifier 186 providing further gain drive and power amplification. After demodulation by the diode ring, generally designated by reference numeral 193, the amplified chopper-section error is filtered by resistor 195-capacitor 196 filter combination and the resulting DC fed to the second input of differential amplifier 175.

It is to be understood that the components described above are merely representative of suitable apparatus and are not to be taken as placing any limitations on the invention.

Referring again to the basic converter embodiments of FIGURES 1–4, it will be apparent that if the auxiliary loop including amplifier 30 is employed alone, balancing of the main loop, which includes amplifier 23 and the direct feedback to thermoelement 12, may be accomplished manually, if desired, in a thermal transfer standard. Thus, for example, thermistors whose operating points have not heretofore been found sufficiently stable for precision thermal transfer applications may be employed for such purposes with the manual balance if the auxiliary loop is operated automatically.

Again it is to be stressed that thermoelements other than thermocouples or thermistors of the conventional type may also be employed in the apparatus according to the invention without deviating from the scope of the invention. Such devices as multi-junction thermocouples and multi-bead thermistors are readily apparent extensions, and, in general, any thermally-sensitive element whose operating point can be monitored and stabilized by application of auxiliary orthogonal feedback may also be used.

It will also be noted that the invention is applicable to situations in which the input to the converter system is not a current, or an input current proportional to an input potential, but is rather an ambient temperature differential between the first and second thermoelements; such a situation exists, for example, in fluid flow measurements and in ambient differential measurements. Absolute temperature measurement of the input thermoelement may also be obtained, as may absolute radiation measurements for radiation impinging on the input thermoelement, and differential radiation measurements for radiation impinging on both the input thermoelement and the feedback thermoelement.

It is to be further noted that in the configurations shown in FIGURES 1–4, some simplifications may be effected in those cases involving measuring of temperatures or radiant energies, or in any situation in which the heater of the input thermoelement 10 is employed only for auxiliary feedback purposes. For example, in such cases, the auxiliary feedback from the output of amplifier 30 may be applied in AC form to the heater of each thermoelement (i.e., thermoelements 10 and 12) assuming that the output of amplifier 23 is DC. In the latter event, the reference signal may be a combination of AC and DC references; the AC may be blocked from the output of amplifier 23 by employing a low pass filter and the DC blocked from the output of amplifier 30 by means of a high pass filter (e.g., a simple coupling capacitor) so that no modulator or demodulator need be employed in the system.

Another situation to which the invention is applicable is that in which the reference voltage $E_{Ref}$ incorporates random noise plus DC, for example, and in which it is desired to generate a random noise signal or some other non-typical waveform whose RMS amplitude is proportional to the RMS input signal (which may, of course, be DC). By blocking the DC output of amplifier 23, using a simple high pass filter, and blocking the AC output of amplifier 30, using a low pass filter, and modulating the DC from the latter amplifier prior to application to the heater of thermoelement 10, the output voltage $E_o$ is a waveform representative of the AC component of the reference voltage, in particular the random noise or other non-typical waveform, while the RMS value of $E_o$ is proportional to the RMS value of the input current $I_{in}$.

This may also be accomplished, by way of further example, by converting the DC output of amplifier 23 to the form of signal desired for the output voltage—i.e., square-wave, sine wave, pulses, etc.—prior to application of the feedback signal to thermoelement 12.

These and previously given examples will clearly indicate that while I have disclosed certain embodiments of my invention, variations in the particular details of construction shown and described herein may be resorted to without departing from the spirit and scope of the invention as defined by the appended claims.

I claim:

1. RMS conversion apparatus comprising, in combination, first and second transducers, each of said transducers having an input circuit and an output circuit and each having an output circuit characteristic whose value varies in accordance with the power generated by a signal applied to the respective input circuit, circuit means connecting the output circuitry of said transducers to derive an error signal representative of the difference between the values of said output circuit characteristics of said transducers, means for applying a waveform whose RMS value is to be detected to the input circuit of one of said first and second transducers, means for applying an amplified version of said error signal to the input circuit of the other of said first and second transducers, means for monitoring the value of said output circuit characteristic of one of said first and second transducers, means for comparing the monitored value with the value of a corresponding reference characteristic and for deriving therefrom a further error signal representative of the difference therebetween, and means for feeding back correction signal derived from said further error signal to each of the input circuits of said transducers to maintain the operating point of each transducer at a substantially constant value irrespective of ambient operating conditions about said transducers and of signal applied to the input circuits of said transducers, whereby said amplified version of the first-mentioned error signal is proportional to the true RMS value of said input waveform.

2. The combination according to claim 1 wherein said correction signal is respectively orthogonal to said input waveform and to the amplified version of the first-mentioned error signal.

3. The combination according to claim 1 wherein the powers developed by the effective values of correction signal and input signal are additive in the respective input circuit of each transducer, whereby the respective output circuit characteristic of each transducer varies in proportion to see additive power.

4. The combination according to claim 1 wherein each of said first and second transducers is a thermoelement, and wherein each of said input circuits comprises means for generating heat in proportion to the power dissipated therein, said power being proportional to the square of the effective value of signal applied to said heat generating means, and wherein each of said output circuits comprises a temperature-sensitive element having output terminals across which a variation in the temperature to which the element is subjected is exhibited as a proportional variation in said output circuit characteristic.

5. The combination according to claim 4 wherein said output circuit characteristic is resistance, and said circuit means includes a bridge circuit having the temperature-sensitive element of each of said thermoelements in separate respective legs thereof and adapted to produce an output signal proportional to the difference in resistance between the temperature-sensitive elements, and wherein said monitoring means includes a further bridge circuit having one leg in common with the first-named bridge circuit and having a resistance in the other leg with which the value of resistance of the temperature-sensitive element in the common leg is to be compared, said further bridge circuit adapted to produce an output signal proportional to the difference value of resistance detected from the comparison.

6. The combination according to claim 5 wherein each of the heat generating means of said thermoelements includes first and second heaters, and wherein respective input signal or amplified error signal is applied to the first heater and correction signal derived from the output signal of said further bridge circuit applied to the second heater of each of said thermoelements.

7. The combination according to claim 5 wherein each of the heat generating means of said thermoelements is a single heater, and wherein the corerction signal applied to each heater is orthogonal to the respective input signal applied to each heater.

8. The combination according to claim 4 wherein said output circuit characteristic is exhibited as a voltage across said output terminals of each of said elements, and wherein said corresponding reference characteristic is a voltage of preselected value with which the value of voltage across the output terminals of the monitored element is to be compared, said further error signal being derived from the difference between the values of the compared voltages, and wherein said circuit means derives the first-mentioned error signal from the difference in value of the voltages across the output terminals of the temperature-sensitive elements of said thermoelements.

9. The combination according to claim 8 wherein each of the heat generating means of said thermoelements includes first and second heaters, and wherein respective input signal or amplified error signal is applied to the first heater and correction signal derived from said further error signal applied to the second heater of each of said thermoelements.

10. The combination according to claim 8 wherein each of the heat generating means of said thermoelements is a single heater, and wherein the correction signal applied to each heater is orthogonal to the respective input signal applied to each heater.

11. An RMS converter comprising a first thermoelement, a second thermoelement, each of said thermoelements characterized by a measurable electrical parameter that varies in accordance with the power produced by the effective value of signal applied to the thermoelement, means connecting the thermoelements to sense the difference in value between said electrical parameter of each, means responsive to said difference in value sensed by the first-named means for generating an output signal proportional to said difference, means for applying a feedback signal derived from said output signal to said second thermoelement, means for applying an input signal derived from the signal whose RMS value is to be converted to said output signal to said first thermoelement, and means responsive to the difference between the value of said parameter of one of said first and second thermoelements and the preselected value of a corresponding reference parameter for applying correction signal proportional to the last-named difference to each of said thermoelements to maintain said thermoelements at a constant thermal operating point.

12. The combination according to claim 11 wherein the correction signal applied to said first thermoelement is orthogonal to said input signal and the correction signal applied to said second thermoelement is orthogonal to said feedback signal.

13. The combination according to claim 11 wherein each of said thermoelements includes a pair of heaters and a thermally-sensitive device exhibiting said parameter, and wherein the correction signal is applied to one of said pair of heaters and any other applied signal to the other of said pair of heaters in each respective thermoelement, so that the power dissipated in the form of heat by either one of said thermoelements is the sum of the power deriving from the effective value of the correction signal and the power deriving from the effective value of the other signal applied to the respective thermoelement.

14. RMS-to-DC conversion apparatus comprising a high-gain DC amplifier, a pair of thermoelements each having a DC output that varies proportionally to the power generated by a signal applied to its respective input, means coupling the outputs of the pair of thermoelements in opposing relationship for application to said amplifier, means for utilizing the DC output of said amplifier as the useful output of said conversion apparatus, means for feeding back a portion of said DC output of said amplifier to one of said thermoelements, means for applying the waveform to be converted to the other of said thermoelements, and means for comparing the output of one of said thermoelements to a preselected reference to produce a corrective factor tending to maintain the thermal operating points of said thermoelements invariant, said corrective factor having an orthogonal relationship to each of the respective inputs of said thermoelements so that the output of each thermoelement is proportional to the sum of the squares of the RMS value of its corrective factor and the RMS value of its respective input.

15. The combination according to claim 14 wherein said means for comparing includes means for monitoring the thermally-sensitive parameter responsible for said proportionally varying output of one of said thermoelements, means responsive to the difference between the value of the monitored parameter and the value of a corresponding reference parameter for generating an error voltage representative of said difference, and means for converting the error voltage to respective currents constituting the corrective factor for each of said thermoelements and for applying said currents to the respective thermoelements.

16. The combination according to claim 14 wherein each of said thermoelements comprises a thermistor and associated heater means, and wherein said means for comparing includes a bridge circuit having the thermistor of one of said thermoelements in one leg thereof and having a reference resistance in the other leg thereof, the difference between the resistance values of the bridge thermistor and said reference resistance constituting said corrective factor, means for energizing said bridge to produce an output voltage representative of said corrective factor, and means for converting the bridge output voltage to proportionally varying feedback signals for application to the respective heater means of said thermoelements in orthogonal relationship to the respective input signal to each thermoelement.

17. The combination according to claim 14 wherein each of said thermoelements comprises a thermocouple and associated heater means, and wherein said means for comparing includes a DC operational amplifier responsive to the DC output voltage of the thermocouple of one of said thermoelements and to a preselected DC reference voltage to produce a DC output voltage representative of the difference therebetween, and means for feeding back signals derived from the last-named DC output voltage to the respective heater means of said thermoelements in orthogonal relationship to the respective input signal applied to each thermoelement.

18. RMS conversion apparatus comprising, in combination, first and second transducers, each of said transducers having an input circuit and an output circuit and each having a response which varies at least approximately in accordance with the power generated by a signal applied to its input circuit, means for applying a waveform whose RMS value is to be detected to the input circuit of one of said first and second transducers, means responsive to said transducers to derive an error signal representative of the difference between the values of said responses of said transducers, means for applying an amplified version of said error signal to the input circuit of the other of said first and second transducers, means for comparing the response of one of said first and second transducers with the value of a reference and for deriving a further error signal representative of a diffeence between said last mentioned response and said reference, and means for feeding back correction signal derived from said further error signal to each of the input circuits of said transducers to maintain the operating points of said transducers at a substantially constant value irrespective of ambient operating conditions about said transducers and of signal applied to the input circuits of said transducers, whereby said amplified version of the first-mentioned error signal is proportional to the true RMS value of said input waveform.

19. In combination, a first device responsive to a first signal to produce a first response, a second device responsive to a second signal to produce a second response, means responsive to said first and second responses to produce a first error signal representing the difference of said responses, means responsive to said first error signal for generating said second signal as a feedback signal tending to reduce said responses to equality, a source of reference signal, means responsive to said reference signal and one of said responses to generate second error signals, and means resposive to said second error signals to drive both said responses toward a predetermined common value determined by the value of said reference signal.

20. The combination according to claim 19 wherein said reference signal is selected to provide equality of responses of said devices for equal values of said signals.

21. The combination according to claim 19 wherein said responses are values of voltage.

22. The combination according to claim 19 wherein said responses are values of resistance.

23. The combination according to claim 19 wherein said devices are thermocouples, said signals are heating currents for said thermocouples and said responses are voltage outputs of said thermocouples.

24. The combination according to claim 19 wherein said devices are thermistors, said signals are heating currents for said thermistors, and said responses are resistance values of said thermistors.

25. The combination according to claim 19 wherein said second error signals include an error signal orthogonal to said first signal and means additively combining said first signal and said an error signal orthogonal to said first signal.

26. The combination according to claim 19 wherein said error signals include an error signal orthogonal to said feedback signal, and means additively combining said feedback signal and said an error signal orthogonal to said error signal.

27. In combination, a first thermal device responsive to a first signal to produce a first response, a second thermal device responsive to a second signal to produce a second response, means responsive to the difference of said first and second responses to generate a control signal, means applying said control signal as said second signal in such sense as to tend to reduce said difference to zero, and further means for automatically driving each of said devices to a predetermined operating condition in which both of said devices produce equal responses in response to equal signals.

28. The combination according to claim 27 wherein said further means includes a source of reference response, means responsive to said reference response and one of said first and second responses to generate further error signals, and means responsive to said further error signals for driving both said responses to equality, wherein said further error signals are orthogonal to said first and second signals, and wherein said devices have non-linear transfer characteristics of response to signal.

29. A method of producing an electrical signal having a magnitude which is linearly proportional to the RMS value of an input signal comprising: applying the input signal to a first thermoelectric transducer; comparing the output of the first thermoelectric transducer with that of a second transducer and producing a control signal which is also a network output; applying the control signal to the second transducer; producing two error signals which are related to the magnitude of the transducer outputs; and applying the error signals to the two transducers to drive the transducers toward a preselected operating point.

30. A method of converting an input signal to an output signal having a magnitude linearly proportional to the RMS value of the input signal comprising: passing the input signal through the heater of a thermal converter; passing a second signal through the heater of a second thermal converter; maintaining thermally responsive devices in good heat exchange relationship with the heaters to produce responses to the currents passed through the respective heaters; developing the second signal from the difference between the responses; developing additional signals from the deviation of at least one of the responses from a preselected level; and applying the additional signals to the heaters in a direction to return the responses to the preselected level.

References Cited

UNITED STATES PATENTS

| | | | |
|---|---|---|---|
| 3,213,364 | 10/1965 | Miller et al. | 324—106 |
| 3,262,055 | 7/1966 | Justice | 324—105 X |
| 3,267,376 | 8/1966 | Harries | 324—106 |
| 3,327,199 | 6/1967 | Gardner et al. | 321—18 X |

JOHN F. COUCH, *Primary Examiner.*

W. H. BEHA, *Assistant Examiner.*

U.S. Cl. X.R.

324—105, 106

Disclaimer and Dedication

3,435,319.—*Peter L. Richman*, Lexington, Mass. THERMAL RMS CONVERTER WITH FEEDBACK TO CONTROL OPERATING POINT. Patent dated Mar. 25, 1969. Disclaimer and dedication filed Mar. 17, 1971, by the assignee, *Weston Instruments, Inc.*

Hereby enters this disclaimer to the remaining term of said patent and dedicates said patent to the Public.

[*Official Gazette April 27, 1971.*]